United States Patent
Li et al.

(10) Patent No.: US 10,209,561 B2
(45) Date of Patent: Feb. 19, 2019

(54) BACKLIGHT WITH STAGGERED ROWS OF LEDS

(71) Applicants: BOE TECHNOLOGY GROUP CO., LTD., Beijing (CN); BEIJING BOE CHATANI ELECTRONICS CO., LTD., Beijing (CN)

(72) Inventors: Jinze Li, Beijing (CN); Zhendong Zhou, Beijing (CN); Dongsheng Yang, Beijing (CN)

(73) Assignees: BOE TECHNOLOGY GROUP CO., LTD., Beijing (CN); BEIJING BOE CHATANI ELECTRONICS CO., LTD., Beijing (CN)

( * ) Notice: Subject to any disclaimer, the term of this patent is extended or adjusted under 35 U.S.C. 154(b) by 0 days.

(21) Appl. No.: 15/508,404

(22) PCT Filed: Sep. 9, 2016

(86) PCT No.: PCT/CN2016/098570
§ 371 (c)(1),
(2) Date: Mar. 2, 2017

(87) PCT Pub. No.: WO2017/071416
PCT Pub. Date: May 4, 2017

(65) Prior Publication Data
US 2017/0299921 A1 Oct. 19, 2017

(30) Foreign Application Priority Data
Oct. 30, 2015 (CN) .......................... 2015 1 0725820

(51) Int. Cl.
*G02F 1/00* (2006.01)
*G02F 1/1335* (2006.01)

(52) U.S. Cl.
CPC .. *G02F 1/133603* (2013.01); *G02F 1/133524* (2013.01); *G02F 1/133605* (2013.01);
(Continued)

(58) Field of Classification Search
CPC .. G02F 1/133602–1/133603; G02F 1/133615; G02F 1/133606; G02F 1/133605; G02F 1/133608; G02F 1/133611
See application file for complete search history.

(56) References Cited

U.S. PATENT DOCUMENTS 7,632,002 B1 * 12/2009 Park ..................... G02B 6/0088
349/65
8,052,295 B2 * 11/2011 Kim ................... G02F 1/133603
362/225

(Continued)

FOREIGN PATENT DOCUMENTS

CN 101063766 A 10/2007
CN 102359716 A 2/2012

(Continued)

OTHER PUBLICATIONS

The First Chinese Office Action dated May 17, 2017; Appln. No. 201510725820.1.

(Continued)

*Primary Examiner* — Sean P Gramling
*Assistant Examiner* — Gerald J Sufleta, II
(74) *Attorney, Agent, or Firm* — Ladas & Parry LLP

(57) ABSTRACT

A backlight module and a display device. The backlight module comprises a plurality of light strips arranged along a first direction on a same plane, where each of the light strips extends along a second direction on the plane and comprises: a printed circuit board and a plurality of light sources. The printed circuit board comprises a first mounting surface and a second mounting surface which are opposite to (Continued)

each other and not parallel to the plane; the plurality of light sources is electrically connected with the printed circuit board and comprises a plurality of first light sources and a plurality of second light sources, where the first light sources are disposed on the first mounting surface of the printed circuit board, and the second light sources are disposed on the second mounting surface of the printed circuit board. The backlight module has relatively high brightness.

17 Claims, 4 Drawing Sheets

(52) U.S. Cl.
CPC ............... *G02F 1/133608* (2013.01); *G02F 2001/133613* (2013.01)

(56) References Cited

U.S. PATENT DOCUMENTS

| | | |
|---|---|---|
| 2006/0138951 A1 | 6/2006 | Tain et al. |
| 2007/0253219 A1 | 11/2007 | Kim et al. |
| 2008/0297700 A1 | 12/2008 | Yu et al. |
| 2010/0283718 A1* | 11/2010 | Choi .................... G02B 6/0068 345/102 |
| 2013/0256705 A1 | 10/2013 | Huang |
| 2013/0271956 A1 | 10/2013 | Huang |
| 2014/0307473 A1* | 10/2014 | Chen .................... G02B 6/0068 362/613 |
| 2015/0003109 A1* | 1/2015 | Wu ...................... G02B 6/0035 362/612 |

FOREIGN PATENT DOCUMENTS

| | | |
|---|---|---|
| CN | 102644879 A | 8/2012 |
| CN | 102661535 A | 9/2012 |
| CN | 202647367 U | 1/2013 |
| CN | 102980101 A | 3/2013 |
| CN | 105258027 A | 1/2016 |
| CN | 2015174112 U | 4/2016 |
| JP | 2010-250013 A | 11/2010 |

OTHER PUBLICATIONS

International Search Report and Written Opinion dated Nov. 29, 2016; PCT/CN2016/098570.
The Second Chinese Office Action dated Oct. 26, 2017; Appln. 20151075820.1.

* cited by examiner

BACKLIGHT WITH STAGGERED ROWS OF LEDS

TECHNICAL FIELD

At least one embodiment of the present disclosure relates to a backlight module and a display device.

BACKGROUND

A backlight module can provide uniformly-distributed backlight with sufficient brightness for a display panel of a non-emissive display device (for example, a liquid crystal display device).

Generally, a backlight module includes a back plate, a light source subassembly disposed at a side of the back plate, a light guide plate and optical films disposed at a side of the light guide plate. For example, these optical films may include a reflective sheet, a brightness enhancement film, a diffusing sheet, a prism sheet and so on. For example, the light source subassembly can be a LED (light emitting diode) light strip, which includes a printed circuit board and a plurality of LEDs disposed thereon. Positive and negative poles of every LED are electrically connected with the printed circuit board, such that the printed circuit board can transport current to every LED to drive the LED to emit light.

SUMMARY

At least one embodiment of the present disclosure provides a backlight module and a display device, so as to achieve high brightness display of a display device.

At least one embodiment of the present disclosure provides a backlight module, which includes a plurality of light strips sequentially arranged along a first direction on a same plane. Each of the light strips extends along a second direction on the plane and includes a printed circuit board and a plurality of light sources; the printed circuit board includes a first mounting surface and a second mounting surface which are opposite to each other and not parallel to the plane; the plurality of light sources is electrically connected with the printed circuit board and includes a plurality of first light sources disposed on the first mounting surface of the printed circuit board and a plurality of second light sources disposed on the second mounting surface of the printed circuit board.

At least one embodiment of the present disclosure further provides a display device, which includes the above-mentioned backlight module.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

Figure 1A:
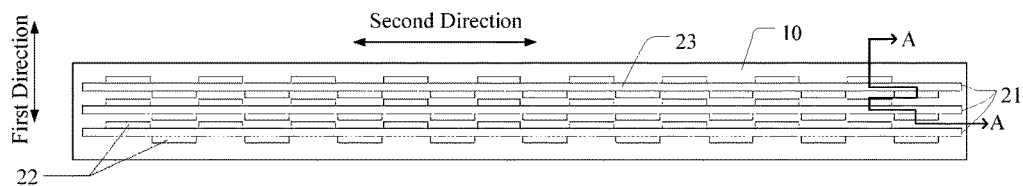
FIG. 1a is a schematic diagram of an arrangement of a plurality of light strips in a backlight module according to an embodiment of the present disclosure.

In order to make objects, technical details and advantages of the embodiments of the disclosure apparent, the technical solutions of the embodiment will be described in a clearly and fully understandable way in connection with the drawings related to the embodiments of the disclosure. It is obvious that the described embodiments are just a part but not all of the embodiments of the disclosure. Based on the described embodiments herein, those skilled in the art can obtain other embodiment(s), without any inventive work, which should be within the scope of the disclosure Unless otherwise defined, all the technical and scientific terms used herein have the same meanings as commonly understood by one of ordinary skill in the art to which the present disclosure belongs. The terms "first," "second," and so on which are used in the description and the claims of the present application for disclosure, are not intended to indicate any sequence, amount or importance, but distinguish various components. Also, the terms such as "a," "an," and the like are not intended to limit the amount, but indicate the existence of at least one. The terms "comprises," "comprising," "includes," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

In a display device employing a backlight module, the brightness of the backlight, module is directly related to the display brightness of the display device. At present, it is possible to employ a backlight module with ultra-high brightness in some applications to meet the requirement for brightness.

During research, inventors of the present application notice that: generally, a configuration approach of a light strip employing light emitting diodes (LED) in a backlight module is to weld the LEDs on a single surface of the printed circuit board of the light strip, and then to place the light strip on, for example, a back plate; however, this kind of structure cannot be arranged with more LEDs, and cannot meet the requirement for ultra-high brightness, and the reasons are provided in the following. First, upon welding LEDs on the printed circuit board, the size of the position (for example, the position is formed with a welding pad, a jack and the like) used for the electrical connection with the positive/negative poles of a LED on the printed circuit board needs to be larger than the size of the welding pad on the bottom of the LED. That is, the size of the position used for the electrical connection with a LED on the printed circuit board has restriction on a lower bound. Second, the distance between two LEDs should not be too small, otherwise, an entire strength of the light strip may be damaged. Third, a LED is generally welded on the printed circuit board through tin creams; in this case, if LEDs are arranged densely on the printed circuit board, upon processing on the back plate, a tin cream is heated and may flow to incur direct contact between the tin cream and an adjacent tin cream. Thus, regarding to the situation that a single surface of the printed circuit board is welded with LEDs in the LED light strip, it is hard to meet the requirement for ultra-high brightness for a backlight module by simply increasing the number of LEDs.

Figure 1B:
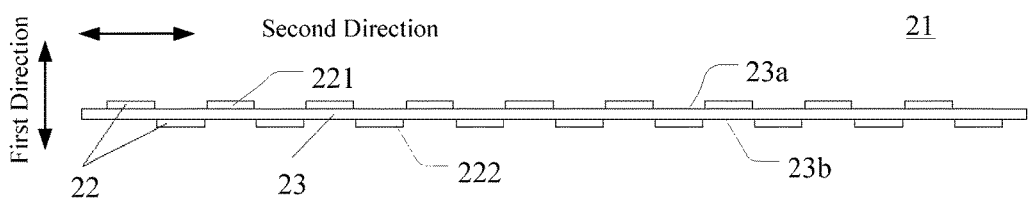
FIG. 1b is a structural schematic diagram of a light strip in a backlight module according to an embodiment of the present disclosure.

At least one embodiment of the present disclosure provides a backlight module, as illustrated by FIG. 1a and FIG. 1b, the backlight module includes a plurality of light strips 21 (FIG. 1a only illustrates three light strips 21 as an example) sequentially arranged along a first direction on a same plane 10, each of the light strips 21 extends along a second direction on the plane 10 and includes a printed circuit board 23 and a plurality of light sources 22; the printed circuit board 23 includes a first mounting surface 23a and a second mounting surface 23b which are opposite to each other and not parallel to the plane 10; the light sources 22 are electrically connected with the printed circuit board 23 and include a plurality of first light sources 221 disposed on the first mounting surface 23a of the printed circuit board 23 and a plurality of second light sources 222 disposed on the second mounting surface 23b of the printed circuit board 23. Besides, for example, a printed circuit board with a single mounting surface can be further disposed at one side or two sides of the above-mentioned light strips.

Compared with the approach that LEDs are provided on a single surface of the printed circuit board, the embodiments of the present disclosure can effectively increase the number of the light sources in the backlight module by mounting light sources on two opposite mounting surfaces of the printed circuit board, so as to improve the brightness of the backlight module.

For example, the first direction and the second direction can be perpendicular to each other on the plane 10. However, the embodiments of the present disclosure include this case but are not limited thereto.

For example, the light sources 22 can be light emitting diodes.

In at least one embodiment, for example, as illustrated by FIG. 1b, in each of the light strips 21, the first light sources 221 disposed on the first mounting surface 23a of the printed circuit board 23 and the second light sources 222 disposed on the second mounting surface 23b of the printed circuit board 23 can be staggered with each other along the second direction. In this way, the disposing positions of the first light sources 221 and the disposing positions of the second light sources 222 on the same light strip can be staggered with each other along the second direction to avoid the stress concentration on the printed circuit board, so as to avoid the strength reduction of the printed circuit board 23, and avoid the situation that the printed circuit board breaks.

Figure 1C:
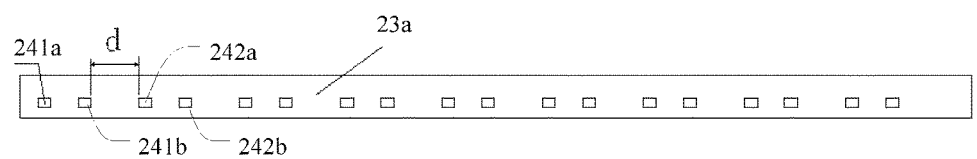
FIG. 1c is a schematic diagram showing positions on a first mounting surface of the printed circuit board in the light strip illustrated by FIG. 1b, where first light sources are to be electrically connected to the printed circuit board at the positions.
Figure 1D:
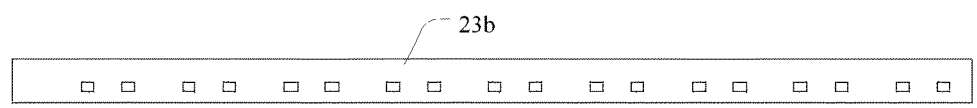
FIG. 1d is a schematic diagram showing positions on a second mounting surface of the printed circuit board in the light strip illustrated by FIG. 1b, where second light sources are to be electrically connected to the printed circuit board at the positions.

FIG. 1c is a schematic diagram of positions on the first mounting surface of the printed circuit board in the light strip illustrated by FIG. 1b, where the first light sources are to be electrically connected with the printed circuit board at the positions; FIG. 1d is a schematic diagram of positions on the second mounting surface of the printed circuit board in the light strip illustrated by FIG. 1b, where the second light sources are to be electrically connected with the printed circuit board at the positions. Referring to FIG. 1c and FIG. 1d, both the first mounting surface 23a and the second mounting surface 23b of the printed circuit board are provided with a plurality of positions (hereafter, referred to as "connection positions", for example, the connection positions being coated with tin creams) to be electrically connected with the light sources, and each of the light sources (not shown in FIG. 1c and FIG. 1d) can be electrically connected with the printed circuit board through two adjacent connection positions on the same mounting surface. For example, as illustrated by FIG. 1c, adjacent connection positions 241a and 241b on the first mounting surface 23a of the printed circuit board are used to be electrically connected to one first light source, and adjacent connection positions 242a and 242b are used to be electrically connected to another first light source; and the other connection positions in FIG. 1c and FIG. 1d are configured similarly. Because the first light sources 221 and the second light sources 222 in FIG. 1b are staggered with each other, and correspondingly, the positions to be electrically connected with the first light sources (as illustrated by FIG. 1c) and the positions to be electrically connected with the second light sources (as illustrated by FIG. 1d) are staggered with each other as well.

It is to be noted that, the first light sources 221 and the second light sources 222 at two sides of the printed circuit board 23 of the same light strip are configured to be staggered with each other, which can be a case where the first light sources 221 and the second light sources 222 are disposed alternately along the extending direction (i.e., the second direction) of the printed circuit board 23. In this case, the first light source 221 and the second light source 222 which is adjacent to the first light source 221 are not overlapped with each other in the arrangement direction of the plurality of light strips (i.e., the first direction); or, the first light source 221 and the second light source 222 that is adjacent to the first light source 221 of the same light strip are partially overlapped with each other in the first direction.

In an aspect, in a case where the first light sources 221 and the second light sources 222 of the same light strip are disposed alternately along the second direction, a position where a first light source 221 is electrically connected to the printed circuit board has a relatively large distance to a position where a second light source 222 adjacent to the first light source 221 is electrically connected to the printed circuit board. Therefore, it is beneficial to avoid the strength reduction of the printed circuit board 23, so as to avoid the situation that the printed circuit board breaks.

In another aspect, in a case where the first light sources 221 and the second light sources 222 of the same light strip are disposed alternately along the second direction, for example, the sizes of the first light sources 221 and the sizes of the second light sources 222 along the second direction on the light strip 21 in the backlight module are equal, and a distance between two adjacent light sources 22 located on the same mounting surface of the printed circuit board can be larger than the size of a light source along the second direction. For example, a distance d between the positions where two adjacent first light sources 221 are electrically connected to the printed circuit board is larger than a length of each of the first light sources 221 along the second direction (as illustrated by FIG. 1b and FIG. 1c), and a distance between the positions where two adjacent second light sources 222 are electrically connected to the printed circuit board is larger than a length of each of the second light source 222 along the second direction (as illustrated by FIG. 1d). In this case, for example, in two adjacent light strips, the light sources on the mounting surfaces of one light strip are disposed opposite to the gaps between the light sources on the mounting surfaces of the other light strip (for example, the gaps being provided with a reflective surface) instead of being disposed opposite to the light sources on the mounting surfaces of the other light strip, which can reduce the loss of light and can avoid the interference between the lights emitted by the light sources which are opposite to each other, so as to improve the brightness of the backlight module.

In FIG. 1b to FIG. 1d, both the distance between the adjacent first light sources and the distance between the adjacent second light sources in the same light strip are larger than the size of each of the light sources along the second direction. Certainly, the embodiments of the present disclosure include this case but are not limited thereto. For example, the sizes of the first light sources and the second light sources along the second direction are equal; along the second direction, the distance between the positions where two adjacent first light sources are electrically connected to the printed circuit board may be larger than the size of each of the first light sources, or the distance between the positions where two adjacent second light sources are electrically connected to the printed circuit board can be larger than the size of each of the second light sources. This kind of configuration can be beneficial to avoid the strength reduction of the printed circuit board, and prevent the light sources on the mounting surfaces of the printed circuit boards of the adjacent light strips which are opposite to each other from facing each other, so as to reduce the light loss caused by the configuration that these light sources face with each other.

Figure 2:
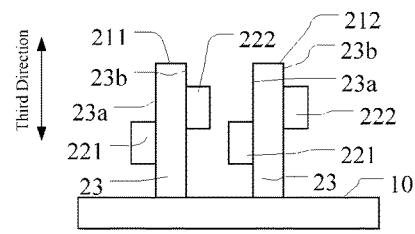
FIG. 2 is a structural schematic diagram of a backlight module according to an embodiment of the present disclosure, in which light sources are staggered in a third direction.

In at least one embodiment, for example, as illustrated by FIG. 2, in each of the light strips (for example, the first light strip 211/the second light strip 212), the first light sources 221 disposed on the first mounting surface 23a of the printed circuit board 23 and the second light sources 222 disposed on the second mounting surface 23b can be staggered with each other along a third direction perpendicular to the plane 10. That is to say, for the same light strip, the distances from the first light sources 221 to the plane 10 can be different from the distances from the second light sources 222 to the plane 10. In this way, at an aspect, it is convenient for configuring the positions where the first light sources 221 are electrically connected to the printed circuit board and the positions where the second light sources 222 are electrically connected to the printed circuit board on the same light strip to be staggered with each other to avoid the stress concentration on the printed circuit board, so as to avoid the strength reduction of the printed circuit board as much as possible, and avoid the situation that the printed circuit board breaks; at another aspect, it can also prevent light sources from facing each other, where the light sources are disposed on the mounting surfaces of the printed circuit boards of adjacent light strips which are disposed facing each other, so as to reduce the light loss caused by the configuration that these light sources face each other, so as to further improve the brightness of the backlight module.

Certainly, the first light sources and the second light sources of each of the light strips can be simultaneously staggered with each other in the second direction and the third direction.

As illustrated by FIG. 2, in two adjacent light strips, one is taken as a first light strip 211, and the other one is taken as a second light strip 212. A second mounting surface 23b of the printed circuit board 23 of the first light strip 211 faces the first mounting surface 23a of the printed circuit board 23 of the second light strip 212. In this case, for example, the second light sources 222 disposed on the second mounting surface 23b of the printed circuit board 23 of the first light strip 211 and the first light sources 221 disposed on the first mounting surface 23a of the printed circuit board 23 of the second light strip 212 can be staggered with each other in the second direction (i.e., an extending direction of each of the light strips) (as illustrated by FIG. 1a, FIG. 1a does not mark the first and second mounting surfaces and the first and second light sources) and/or can be staggered with each other in the third direction perpendicular to the plane 10 (as illustrated by FIG. 2). In this way, it can avoid the second light sources 222 on the printed circuit board 23 of the first light strip 211 from facing the first light sources 221 on the printed circuit board 23 of the second light strip 212 as much as possible, so as to reduce the light loss caused by the configuration that the first light sources and the second light sources face each other as much as possible, so as to further improve the brightness of the backlight module.

The set modes of the positions between the first and second light sources of the same light strip, the positions between the first and second light sources of different light strips and the distances between the first and second light sources of different light strips can be combined in any ways.

For example, in a case where the above-mentioned second light sources 222 of the first light strip 211 and the above-mentioned first light sources 221 of the second light strip 212 are staggered with each other in the second direction and/or the third direction, the sizes of the first light sources and the sizes of the second light sources of each of the light strips along the second direction can be equal; besides, along the second direction, the distance between the adjacent first light sources can be larger than the size of each of the first light sources, and/or, the distance between the adjacent second light sources can be larger than the size of each of the second light sources.

For example, the first light sources and the second light sources of the same light strip can be staggered with each other along the second direction and/or the third direction.

Besides, the first light sources and the second light sources on the mounting surfaces (the mounting surfaces being opposite to each other) of the printed circuit boards of the adjacent light strips can be staggered with each other along the second direction and/or the third direction.

In an embodiment, for example, at least one of the first mounting surface and the second mounting surface of the printed circuit board of each of the light strips can be provided with a reflective surface. That is to say, at least one of the first mounting surface and the second mounting surface of the printed circuit board of each of the light strips can be formed as a reflective surface itself, or can be provided with a reflective film to form a reflective surface. By means of disposing a reflective surface, the light emitted from the light sources can be reflected, causing the light emitted from the light sources to enter, for example, a light guide plate as much as possible, so as to improve the brightness of the backlight source.

Figure 3:
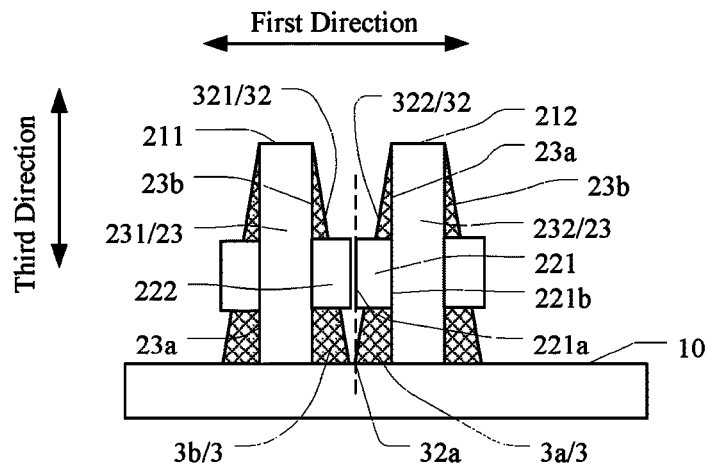
FIG. 3 is a sectional schematic diagram of a backlight module along an A-A line in FIG. 1a according to an embodiment of the present disclosure.

For example, as illustrated by FIG. 3, both the first mounting surface 23a and the second mounting surface 23b of the printed circuit boards 23 of the adjacent first light strip 211 and second light strip 212 can be provided with a reflective surface 32, respectively. Compared with the situation where one of the first mounting surface 23a and the second mounting surface 23b is provided with a reflective surface, the situation illustrated by FIG. 3 is more beneficial to make the light emitted from the light sources enter, for example, a light guide plate as much as possible through reflection.

In the embodiments of the present disclosure, compared with the mode that the first/second mounting surface is formed as a reflective surface itself, the technology of disposing a reflective film to form a reflective surface is simpler. For example, at least one of the first mounting surface and the second mounting surface of the printed circuit board of each of the light strips can be provided with a reflective film to provide the above-mentioned reflective surface. For example, as illustrated by FIG. 3, the printed circuit boards 23 of the first light strip 211 and the second light strip 212 are sequentially arranged along the arrangement direction of the light strips (i.e., the first direction), two sides of each of the printed circuit boards 23 are respectively provided with a reflective film 3, and a surface of the reflective film 3 that is away from the printed circuit board 23 serves as the above-mentioned reflective surface 32.

In at least one embodiment of the present disclosure, for example, the first/second mounting surface can be formed as the above-mentioned reflective surface itself by coating white ink or other similar material on the first/second mounting surface of the printed circuit board.

In at least one embodiment, for example, the above-mentioned reflective surface 32 inclines with respect to the plane 10, as illustrated by FIG. 3. In this way, it is beneficial to make the reflective surface 21 incline with respect to a main light emitting surface of the light source which the reflective surface faces (the main light emitting surface and the mounting surface of the light source that is close to a side where the printed circuit board is located are opposite to each other), so as to reflect the light emitted from the light source, such that the light can enter, for example, a light guide plate as much as possible.

For example, upon the reflective surface 32 being implemented by disposing a reflective film, the cross-sectional shape of the reflective film 3 along the first direction (i.e., the arrangement direction of the plurality of light strips) can be a triangle or trapezoid shape, so as to make the reflective surface 32 to be inclined with respect to the plane 10. Certainly, the embodiments of the present disclosure include this case but are not limited thereto.

For example, as illustrated by FIG. 3, the cross-sectional shape of the reflective film 3 along the first direction is a triangle shape, a surface of the reflective film 3 is attached on the first/second mounting surface, another surface is disposed on the plate surface of the back plate 1 which is provided with the light strip 21, and yet another surface serves as the above-mentioned reflective surface 32.

For example, upon the first/second mounting surface of the printed circuit board being formed as a reflective surface 32 itself, the first/second mounting surface of the printed circuit board can be correspondingly configured to be inclined with respect to the plane 10, so as to implement that the reflective surface 32 inclines with respect to the plane 10.

As illustrated by FIG. 3, each of the first light sources 221 on the first mounting surface 23a of the printed circuit board 23 of each of the light strips (as illustrated by the second light strip 212 in FIG. 3) includes a mounting surface 221b and a main light emitting surface 221a which are opposite to each other; the mounting surface 221b of the first light source 221 is close to the printed circuit board 23 where the first light source 221 is located; the main light emitting surface 221a of the first light source 221 is away from the printed circuit board 23 where the first light source 221 is located. Similarly, each of the second light sources on the second mounting surface 23b of the printed circuit board 23 of each of the light strips includes a mounting surface and a main light emitting surface which are disposed opposite to each other.

In at least one embodiment, for example, the first mounting surface 23a of the printed circuit board 23 of each of the light strips (as illustrated by the printed circuit board 232 of the second light strip 212 in FIG. 3) can be provided with the above-mentioned reflective surface 32 (as illustrated by the reflective surface 322 in FIG. 3); an orthographic projection of the main light emitting surface 221a of the first light source 221 of the first mounting surface 23a on the plane 10 can be located at an edge 32a where the reflective surface 322 intersects with the plane 10 or located on a side of the edge 32a that is away from the printed circuit board 232 where the first light source 221 is located. In this way, compared with the situation where the main light emitting surface 221a of the first light source 221 is disposed at a side of the above-mentioned bottom edge 32a that is close to the printed circuit board 232 where the first light source 221 is located, the light strips 21 disposed in the plane 10 can be arranged closer in the premise of meeting the requirement for a reflective angle of the reflective surface 322, so as to conveniently disposing more light strips 21 in a limited space to improve the brightness of the backlight module.

Similarly, the position relationship between the main light emitting surface of the second light source 222 and the reflective surface 321 on the second mounting surface of the printed circuit board 231 where the second light source 222 are located can be configured with reference to the configuration of the first light sources, and the repeated description is omitted herein.

In the above-mentioned embodiment, upon the reflective surface 32 being implemented by disposing a reflective film 3, the edge 32a where the reflective surface intersects with the plane 10 is an edge of the reflective film 3 close to the plane 10, and the edge is located at a side of the reflective film 3 away from the printed circuit board where the reflective film is located; upon the first/second mounting surface of the printed circuit board being formed as a reflective surface 32 itself, the edge 32a where the reflective surface intersects with the plane 10 is an edge of the first/second mounting surface close to the plane 10.

In at least one embodiment, for example, as illustrated by FIG. 3, in two adjacent light strips, one is taken as a first light strip 211, the other one is taken as a second light strip 212, and a second mounting surface 23b of the printed circuit board 231 of the first light strip 211 faces the first mounting surface 23a of the printed circuit board 232 of the second light strip 212. In this case, the second mounting surface 23b of the printed circuit board 231 of the first light strip 211 and the first mounting surface 23a of the printed circuit board 232 of the second light strip 212 can respectively include a reflective surface 32 (as illustrated by 321 and 322 in FIG. 3), and the reflective surfaces 321 and 322 respectively included by the second mounting surface 23b of the printed circuit board 231 of the first light strip 211 and the first mounting surface 23a of the printed circuit board 232 of the second light strip 212 can intersect with each other at the same position in the plane 10 (for the purpose of convenient viewing, as illustrated by FIG. 3, the intersecting positions of the plane 10 and the reflective surfaces 321 and 322 are different). That is to say, upon the reflective surface 32 being implemented by disposing a reflective film 3, the reflective film 3b on the second mounting surface 23b of the printed circuit board 231 of the first light strip 211 and the reflective film 3a on the first mounting surface 23b of the printed circuit board 231 of the second light strip 212 intersect with each other at the same position in the plane 10 (i.e., the bottoms of the reflective films 3a and 3b that are close to the plane 10 contact with each other); upon the first/second mounting surface of the printed circuit board being formed as a reflective surface 32 itself, the second mounting surface 23b of the printed circuit board 231 of the first light strip 211 and the first mounting surface 23a of the printed circuit board 232 of the second light strip 212 are inclined, and the bottom of the second mounting surface 23b of the first light strip 211 and the bottom of the first mounting surface 23a of the second light strip 212 that are close to the plane 10 contact with each other.

Compared with the situation that the reflective surface 321 and the reflective 322 are separated from each other, the configuration that the reflective surfaces 321 and 322 contact with each other can allow the light strips 21 disposed on the plane 10 to be arranged closer in the premise of meeting the requirement for the reflective angle of the reflective surface 32, so as to conveniently disposing more light strips 21 in a limited space to improve the brightness of the backlight module.

For example, in a case where the reflective surface 321 and the reflective surface 322 are separated with each other, a portion of the plane 10 located between the reflective surface 321 and the reflective surface 322 can be provided with another reflective surface, so as to cause the light emitted from the light source to enter, for example, a light guide plate as much as possible.

Figure 4A:
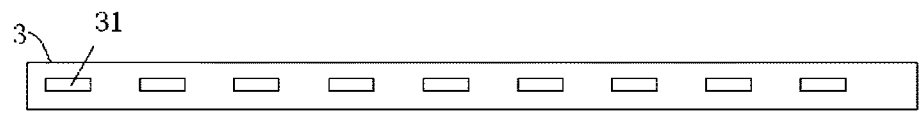
FIG. 4a is a schematic diagram of a backlight module according to an embodiment of the present disclosure, in which a reflective film is provided with openings.
Figure 4B:
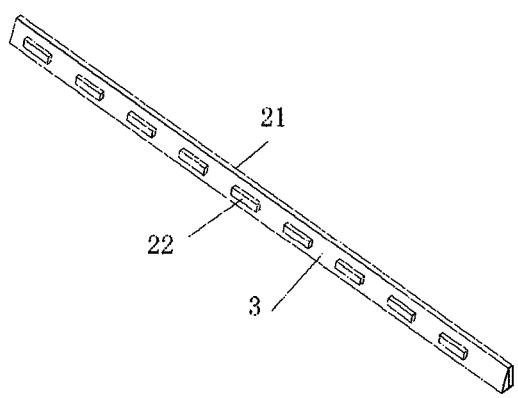
FIG. 4b is a first schematic diagram of a backlight module according to an embodiment of the present disclosure, in which a reflective film is disposed on a light strip.
Figure 4C:
FIG. 4c is a second schematic diagram of a backlight module according to an embodiment of the present disclosure, in which reflective films are disposed on a light strip.

In order to further allow the light strips 21 to be arranged closer, so as to dispose more light sources in a relatively small space, upon the reflective surface 32 being formed by disposing a reflective film 3, for example, as illustrated by FIG. 4a, the reflective film 3 can be provided with a plurality of openings 31; as illustrated by FIG. 4b and FIG. 4c, each of the openings 31 (not shown in FIGS. 4b and 4c) in the reflective film 3 can be correspondingly provided with at least one light source 22. FIG. 4b and FIG. 4c only illustrate that each of the openings is provided with a light source 22 as an example. FIG. 4b only illustrates that a mounting surface of the printed circuit board of the light strip 21 is provided with a reflective film 3, and it can be seen from FIG. 4b that the reflective film 3 includes an inclined reflective surface (not shown in FIG. 4b). FIG. 4c illustrates that two mounting surfaces of the printed circuit board of the light strip are provided with reflective films 3, and FIG. 4c illustrates that the main light emitting surface (not marked in FIG. 4c) of the light source 22 corresponds to the bottom edge (not marked in FIG. 4c) of the reflective film 3.

In FIG. 4b and FIG. 4c, the reflective film 3 extends along an extending direction of the light strip 21, for example, the length of the reflective film 3 is substantially equal to the length of the light strip 21, such that the reflective scope of the reflective film 3 covers all light sources 22 disposed on the light strip 21.

The configurations about the inclining of the reflective surface, the position relationship between the reflective surface and the main light emitting surface of the light source, and the contact of the adjacent reflective surfaces and the set mode that the reflective film includes openings can be combined in any ways, which are not repeated herein.

Figure 5A:
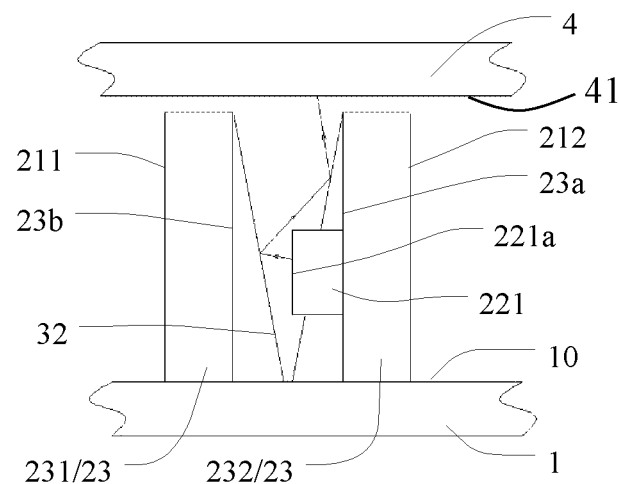
FIG. 5a is an optical path diagram of a light source in a backlight module according to an embodiment of the present disclosure.

In at least an embodiment, for example, as illustrated by FIG. 5a, the backlight module can further include a light guide plate 4, the light guide plate 4 is disposed at a side of the light strips (for example, a first light strip 211 and a second light strip 212) and includes a light incident surface 41 facing the plane 10.

At present, backlight modules with ultra-high brightness adopt a straight down type. Upon the embodiments of the present disclosure being applied to a straight down type backlight module, the brightness of the backlight module can be largely improved. In this case, as illustrated by FIG. 5a, the backlight module further includes a back plate 1, the light strips (for example, a first light strip 211 and a second light strip 212) are disposed on the back plate 1, the light guide plate 4 is opposite to the back plate 1 and disposed on the light strips, and a plate surface of the back plate 1 facing the above-mentioned light strips (i.e., a plate surface facing the light guide plate 4) serves as the above-mentioned plane 10.

Figure 5B:
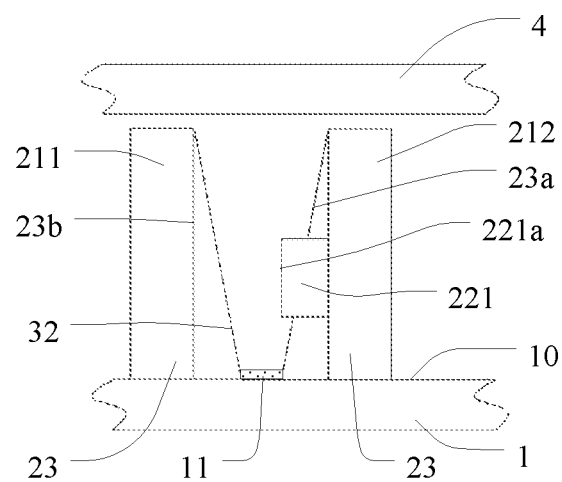
FIG. 5b is a schematic diagram of a backlight module according to an embodiment of the present disclosure, in which a back plate is provided with a reflective sheet.

For example, the plate surface of the back plate 1 facing the light strips can be provided with a reflective sheet 11 (as illustrated by FIG. 5b) or can be a reflective surface. For example, in a case where the reflective surfaces disposed on the opposite mounting surfaces of the printed circuit boards of two adjacent light strips are separated from each other, because the surface of the back plate 1 is a reflective surface or a reflective sheet, light emitted from the light sources can be reflected, and thus, it is beneficial for improving the brightness of the backlight module.

For example, in a case where a plate surface of the back plate facing the light strips is a reflective surface or provided with a reflective sheet, at least one of the first mounting surface and the second mounting surface of the printed circuit board of each of the light strips can be provided with a reflective surface 32. For example, the reflective surface 32 can incline with respect to the plane 10. The configuration of the reflective surface can be implemented with reference to the above-mentioned embodiments, and the repeated description is omitted herein.

For example, the printed circuit board of the light strip can adopt a rigid printed circuit board, and in this case, for example, the rigid printed circuit board can be connected with the back plate 1 through screw thread; or, the printed circuit board of the light strip can adopt a flexible printed circuit board, and in this case, for example, the flexible printed circuit board can be connected with the back plate 1 by disposing a support plate (for example, a vertical support plate).

Certainly, because two sides of the printed circuit board of the light strip in the backlight module provided by the embodiments of the present disclosure are provided with light sources, i.e., the backlight module of the embodiments of the present disclosure has more light sources than the backlight module in which light sources are provided on a single surface of the printed circuit board, the embodiments of the present disclosure can improve the brightness of the side-entrance type backlight module to a certain degree.

Hereafter, the optical path of the light source in the backlight module provided by the embodiments of the present will be described with reference to FIG. 5a. As illustrated by FIG. 5a, the plane 10 (i.e., a surface of the back plate 1) is provided with a first light strip 211 and a second light strip 212 which are adjacent to each other. The reflective film (not shown in FIG. 5a) disposed on the second mounting surface 23b of the printed circuit board 231 of the first light strip 211 is provided with an inclined reflective surface 32. A main light emitting surface 221a of the first light source 221 disposed on the first mounting surface 23a of the printed circuit board 232 of the second light strip 212 and the reflective surface 32 are disposed opposite to each other, and the light emitted from the main light emitting surface 221a of the first light source 221 directly irradiates on the reflective surface 32, and enters, for example, a light guide plate 4 after being reflected.

In a case where all light emitted from the main light emitting surface 221a of the first light source 221 is irradiated on the reflective surface (for example, a reflective surface 32), compared with the situation that at least a part of the light emitted from the main light emitting surface 221a irradiates on the second light source (not shown in FIG. 5a) on the first light strip 211, the light loss is less, and light entering the light guide plate 4 is more, such that the brightness of the backlight module is higher. That is to say, upon the first light source 221 of the second light strip 212 and the second light source of the first light strip 211 in FIG. 5a being separated from each other in an extending direction of the light strip and/or a direction perpendicular to the plane 10, the brightness of the backlight module is higher.

Similarly, the light emitted from the main light emitting surface of the second light source disposed on the first light strip 211 can also directly irradiate on the reflective surface disposed on the first mounting surface 23a of the printed circuit board 232 of the second light strip 212, so as to improve the brightness of the backlight module.

Figure 6:
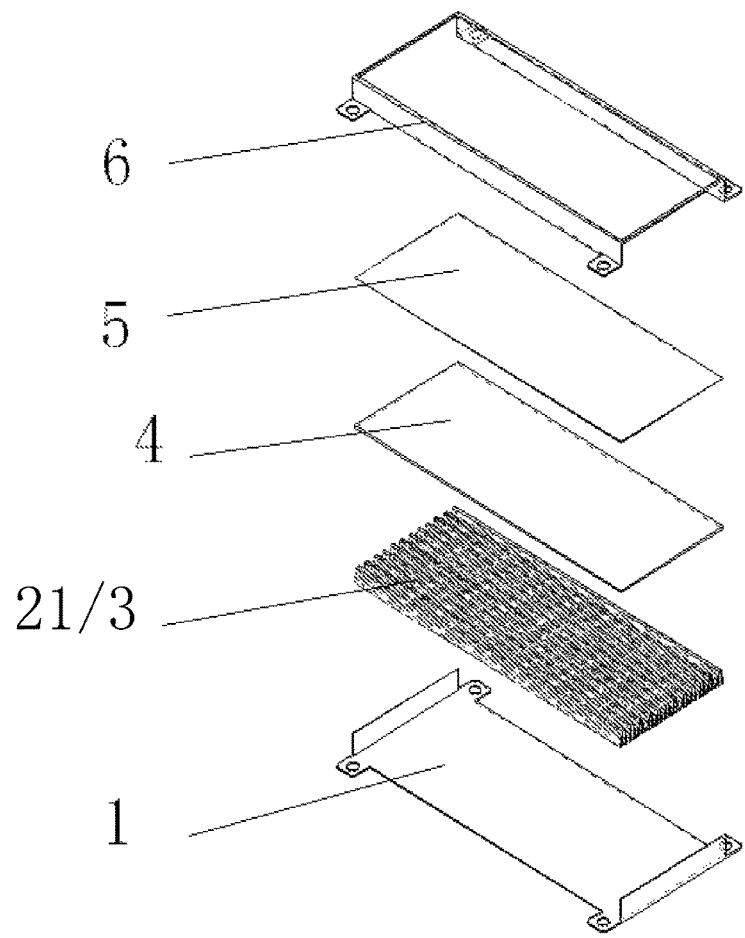
FIG. 6 is an exploded diagram of a backlight module according to an embodiment of the present disclosure.

FIG. 6 is an exploded diagram of a backlight module provided by an embodiment of the present disclosure. Referring to FIG. 6, from bottom to top the backlight module sequentially includes a back plate 1, light strips 21, reflective films 3, a light guide plate 4 and a brightness enhancement film 5. The light strips 21 and the reflective films 3 can adopt the implementations provided by anyone of the abovementioned embodiments. The light strips 21 can be distributed on the whole surface of the back plate 1 facing the light guide plate 4. A sealant frame 6 can work together with the back plate 1 to fix the light strips 21, the reflective films 3, the light guide plate 4 and the brightness enhancement film 5 together, so as to further achieve fixing the entire structure of the backlight module. The situation illustrated by FIG. 6 is merely an example for description, the embodiments of the present disclosure include this but are not limited thereto. For example, the light guide plate 4 can be further provided with other optical films thereon, such as a diffusing sheet and a prism sheet, so as to further improve the performance of the backlight module.

At least one embodiment of the present disclosure further provides a display device, which includes the backlight module according to anyone of the above-mentioned embodiments.

Figure 7:
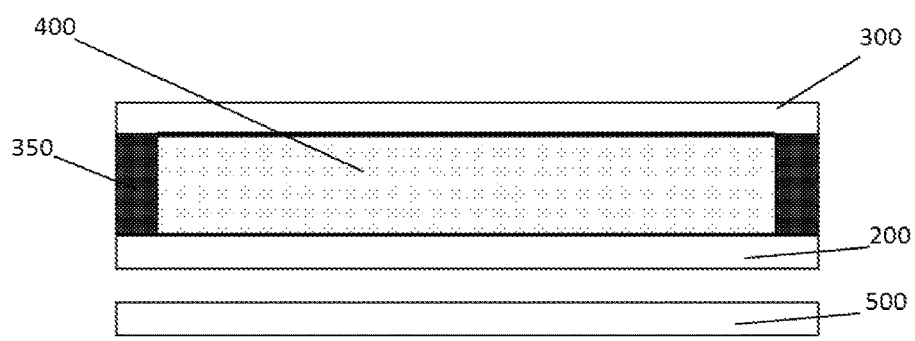
FIG. 7 is a sectional schematic diagram of a display device according to an embodiment of the present disclosure.

For example, as illustrated by FIG. 7, the display device of an embodiment of the present disclosure can be a liquid crystal display device, which can include a display panel and a backlight module 500 disposed at a backside of the display panel. For example, the display panel includes an array substrate 200 and an opposed substrate 300, the array substrate 200 and the opposed substrate 300 are disposed opposite to each other and are sealed together through the sealant 350 to form a liquid crystal cell, and the liquid crystal cell is filled with liquid crystal material 400. For example, the opposed substrate 300 is a color filter substrate.

The display device provided by the embodiments of the present disclosure can be a liquid crystal panel, an electric paper, a cell phone, a flat plate computer, a television, a display device, a notebook, a digital frame, a navigator and any product or component having a display function.

The above-mentioned embodiments can be combined with each other, which does not go beyond the scope of the present disclosure, and can bring better combination effect.

The foregoing are merely specific embodiments of the disclosure, but not limitative to the protection scope of the present disclosure. The protection scope of the disclosure should be defined by the accompanying claims The present disclosure claims the benefits of Chinese patent application No. 201510725820.1, which was filed on Oct. 30, 2015 and is incorporated in its entirety herein by reference as part of this application.

What is claimed is:

1. A backlight module, comprising a plurality of light strips arranged along a first direction on a same plane, wherein each of the light strips extends along a second direction on the plane and comprises:
    a printed circuit board, comprising a first mounting surface and a second mounting surface which are opposite to each other and not parallel to the plane; and
    a plurality of light sources, electrically connected with the printed circuit board and comprising a plurality of first light sources and a plurality of second light sources, wherein the first light sources are disposed on the first mounting surface of the printed circuit board, and the second light sources are disposed on the second mounting surface of the printed circuit board;
    wherein at least one of the first mounting surface and the second mounting surface of the printed circuit board of each of the light strips is provided with a reflective film to provide a reflective surface;
    wherein the reflective film is provided with a plurality of openings, and each of the openings is correspondingly provided with at least one of the light sources.

2. The backlight module according to claim 1, wherein in each of the light strips, the first light sources disposed on the first mounting surface of the printed circuit board and the second light sources disposed on the second mounting surface of the printed circuit board are staggered with each other along the second direction and/or a third direction perpendicular to the plane.

3. The backlight module according to claim 1, wherein in two adjacent ones of the light strips, one is taken as a first light strip, the other one is taken as a second light strip, a second mounting surface of a printed circuit board of the first light strip faces a first mounting surface of a printed circuit board of the second light strip, and the second light sources disposed on the second mounting surface of the printed circuit board of the first light strip and the first light sources disposed on the first mounting surface of the printed circuit board of the second light strip are staggered with each other along the second direction and/or a third direction perpendicular to the plane.

4. The backlight module according to claim 2, wherein:
a size of each of the first light sources along the second direction is equal to a size of each of the second light sources along the second direction;
along the second direction, a distance between two adjacent first light sources is larger than the size of each of the first light sources; and/or
along the second direction, a distance between two adjacent second light sources is larger than the size of each of the second light sources.

5. The backlight module according to claim 1, wherein the reflective surface inclines with respect to the plane.

6. A backlight module, comprising a plurality of light strips arranged along a first direction on a same plane, wherein each of the light strips extends along a second direction on the plane and comprises:
a printed circuit board, comprising a first mounting surface and a second mounting surface which are opposite to each other and not parallel to the plane; and
a plurality of light sources, electrically connected with the printed circuit board and comprising a plurality of first light sources and a plurality of second light sources, wherein the first light sources are disposed on the first mounting surface of the printed circuit board, and the second light sources are disposed on the second mounting surface of the printed circuit board;
wherein at least one of the first mounting surface and the second mounting surface of the printed circuit board of each of the light strips is provided with a reflective surface
wherein the reflective surface inclines with respect to the plane, and
wherein:
the first mounting surface of the printed circuit board of each of the light strips is provided with the reflective surface;
each of the first light sources on the first mounting surface of the printed circuit board of each of the light strips comprises a mounting surface and a main light emitting surface which are opposite to each other, each mounting surface is closer to the printed circuit board than its associated main light emitting surface, each main light emitting surface is farther away from the printed circuit board than its associated mounting surface; and
an orthographic projection of the main light emitting surface on the plane is located at an edge where the reflective surface intersects with the plane or located on a side of the edge away from the printed circuit board.

7. A backlight module, comprising a plurality of light strips arranged along a first direction on a same plane, wherein each of the light strips extends along a second direction on the plane and comprises:
a printed circuit board, comprising a first mounting surface and a second mounting surface which are opposite to each other and not parallel to the plane; and
a plurality of light sources, electrically connected with the printed circuit board and comprising a plurality of first light sources and a plurality of second light sources,
wherein the first light sources are disposed on the first mounting surface of the printed circuit board, and the second light sources are disposed on the second mounting surface of the printed circuit board;
wherein at least one of the first mounting surface and the second mounting surface of the printed circuit board of each of the light strips is provided with a reflective surface
wherein the reflective surface inclines with respect to the plane, and
wherein:
in two adjacent ones of the light strips, one is taken as a first light strip, the other one is taken as a second light strip, and a second mounting surface of a printed circuit board of the first light strip faces a first mounting surface of a printed circuit board of the second light strip; and
both the second mounting surface of the printed circuit board of the first light strip and the first mounting surface of the printed circuit board of the second light strip are respectively provided with a reflective surface, and the reflective surface of the second mounting surface of the printed circuit board of the first light strip and the reflective surface of the first mounting surface of the printed circuit board of the second light strip intersect with each other at a same position in the plane.

8. The backlight module according to claim 1, wherein a cross-sectional shape of the reflective film in the first direction is a triangle or a trapezoid, so as to make the reflective surface be inclined with respect to the plane.

9. The backlight module according to claim 1, further comprising a light guide plate, wherein the light guide plate is disposed at a side of the plurality of light strips and comprises a light incident surface facing the plane.

10. The backlight module according to claim 9, further comprising a back plate, wherein the plurality of light strips are disposed on the back plate, and the light guide plate faces the back plate and is disposed on the plurality of light strips.

11. The backlight module according to claim 10, wherein a plate surface of the back plate facing the plurality of light strips is a reflective surface or provided with a reflective sheet.

12. The backlight module according to claim 11, wherein the reflective surface is inclined with respect to the plane.

13. The backlight module according to claim 1, wherein the light sources are light emitting diodes.

14. A display device, comprising the backlight module according claim 1.

15. The backlight module according to claim 3, wherein:
a size of each of the first light sources along the second direction is equal to a size of each of the second light sources along the second direction;
along the second direction, a distance between two adjacent first light sources is larger than the size of each of the first light sources; and/or
along the second direction, a distance between two adjacent second light sources is larger than the size of each of the second light sources.

16. The backlight module according to claim 5, wherein:
the first mounting surface of the printed circuit board of each of the light strips is provided with the reflective surface;
each of the first light sources on the first mounting surface of the printed circuit board of each of the light strips comprises a mounting surface and a main light emitting surface which are opposite to each other, each mounting surface is closer to the printed circuit board than its associated main light emitting surface, each main light emitting surface is farther away from the printed circuit board than its associated mounting surface; and an orthographic projection of the main light emitting surface on the plane is located at an edge where the reflective surface intersects with the plane or located on a side of the edge away from the printed circuit board.

17. The backlight module according to claim 5, wherein:

in two adjacent ones of the light strips, one is taken as a first light strip, the other one is taken as a second light strip, and a second mounting surface of a printed circuit board of the first light strip faces a first mounting surface of a printed circuit board of the second light strip; and both the second mounting surface of the printed circuit board of the first light strip and the first mounting surface of the printed circuit board of the second light strip are respectively provided with a reflective surface, and the reflective surface of the second mounting surface of the printed circuit board of the first light strip and the reflective surface of the first mounting surface of the printed circuit board of the second light strip intersect with each other at a same position in the plane.

* * * * *